UNITED STATES PATENT OFFICE.

EPHRAIM B. BENEDICT, OF SUSQUEHANNA DEPOT, PENNSYLVANIA.

IMPROVEMENT IN CALCIMINES.

Specification forming part of Letters Patent No. 129,645, dated July 23, 1872.

Specification describing a certain Compound called "Calcimine," invented by E. B. BENEDICT, of Susquehanna Depot, Susquehanna county, Pennsylvania, to be used on side walls, ceilings, and fresco in private or public buildings, and which may be washed or scrubbed.

The nature of the invention of the said BENEDICT consists in mixing the following ingredients, to wit: Cliff-stone whitening, China clay, plaster Paris, quicklime slaked by adding salt and sugar, one-fourth of a pound each, to the water; phosphate of lime, oxide of zinc, dry white lead, light glue dissolved in water, alum, sulphate zinc, salt, white sugar, sulphuric acid, muriatic acid, and water.

No. 1. To prepare the "calcimine" for use take of cliff-stone whitening fifteen pounds; China clay, five pounds; plaster Paris, five pounds; quicklime, (slaked as above directed,) five pounds; phosphate of lime, one-half pound; oxide zinc, two pounds; dry white lead, three and one-half pounds. - (NOTE.—The dry white lead is used to give the "calcimine" a body, and to keep the other ingredients from settling.)

The sizing to mix with the above compound is composed of light glue, one-half pound; alum, one-fourth pound; sulphate zinc, one-fourth pound; salt, one-fourth pound; white sugar, one and one-half pound; arsenic, one ounce, dissolved in water.

The above compound makes white "calcimine" for ceilings.

No. 2. For fresco and side-wall calcimining use, cliff-stone whitening, fifteen pounds; China clay, five pounds; plaster Paris, five pounds; oxide zinc, two pounds; dry white lead, three and one-half pounds; linseed-oil, one quart. Add a sufficient quantity of carbonate of soda, muriatic acid, and sulphuric acid to incorporate the "oil" in the mixture, and the coloring, which may be used to suit the taste.

For sizing: Light glue, one-half pound; alum, one-fourth pound; sulphate zinc, one-fourth pound; salt, one-fourth pound; white sugar, one and one-half pound; sugar of lead, one ounce; arsenic, one ounce, dissolved in water.

No. 2 is embraced in the same application because it is substantially the same "calcimine." The limes are left out of the mixture because they neutralize the color. No. 2 is susceptible of the most delicate colors.

What I claim as my invention is—

The combination of ingredients to make a calcimine that will stand washing, as explained and set forth in the annexed specification.

EPHRAIM B. BENEDICT.

Witnesses:
   WILLIAM C. RICE,
   JOHN JORDAN.